(12) United States Patent
Takahashi et al.

(10) Patent No.: US 8,948,956 B2
(45) Date of Patent: Feb. 3, 2015

(54) AUTONOMOUS MOBILE BODY AND CONTROL METHOD OF SAME

(75) Inventors: Masaki Takahashi, Yokohama (JP); Takafumi Suzuki, Yokohama (JP); Toshiki Moriguchi, Kyoto (JP)

(73) Assignee: Murata Machinery, Ltd., Kyoto-shi (JP)

( * ) Notice: Subject to any disclaimer, the term of this patent is extended or adjusted under 35 U.S.C. 154(b) by 0 days.

(21) Appl. No.: 13/510,396

(22) PCT Filed: Nov. 10, 2010

(86) PCT No.: PCT/JP2010/069985
§ 371 (c)(1),
(2), (4) Date: Jun. 11, 2012

(87) PCT Pub. No.: WO2011/062095
PCT Pub. Date: May 26, 2011

(65) Prior Publication Data
US 2013/0131910 A1    May 23, 2013

(30) Foreign Application Priority Data
Nov. 20, 2009   (JP) .................................. 2009-264575

(51) Int. Cl.
*G05D 1/02* (2006.01)
*B25J 5/00* (2006.01)
*B25J 13/00* (2006.01)

(52) U.S. Cl.
CPC ................. *G05D 1/021* (2013.01); *B25J 5/007* (2013.01); *G05D 1/0212* (2013.01); *G05D 1/024* (2013.01); *B25J 5/00* (2013.01); *B25J 13/00* (2013.01); *Y10S 901/01* (2013.01)
USPC ................................................ 701/27; 901/1

(58) Field of Classification Search
USPC .......................................................... 701/27
See application file for complete search history.

(56) References Cited

U.S. PATENT DOCUMENTS

| | | |
|---|---|---|
| 4,954,962 A | 9/1990 | Evans, Jr. et al. |
| 5,040,116 A | 8/1991 | Evans, Jr. et al. |

(Continued)

FOREIGN PATENT DOCUMENTS

| | | |
|---|---|---|
| JP | 63-200210 | 8/1988 |
| JP | 63-229503 | 9/1988 |

(Continued)

OTHER PUBLICATIONS

Suzuki et al., "Obstacle Avoidance Considering Robot's Size for an Autonomous Omni-directional Mobile Robot by Simultaneous Control of Translational and Rotational Motions," the 52nd Automatic Control Union Lecture Meeting Nov. 21 or 22, 2009 (Osaka University).

(Continued)

*Primary Examiner* — Thomas Tarcza
*Assistant Examiner* — Alex C Dunn
(74) *Attorney, Agent, or Firm* — Adli Law Group P.C.

(57) ABSTRACT

An autonomous mobile body is configured to flexibly avoid obstacles. The mobile body has a movement mechanism configured to translate in a horizontal plane and rotate around a vertical axis, and the distance to an obstacle is derived for each directional angle using an obstacle sensor. A translational potential of the mobile body and a rotational potential of the mobile body for avoiding interference with the obstacle are generated, based on the distance from the autonomous mobile body to the obstacle at each directional angle. An amount of control relating to a translational direction and a translational velocity of the mobile body and an amount of control relating to a rotational direction and an angular velocity of the mobile body are generated based on the generated potentials, and the movement mechanism is driven.

17 Claims, 9 Drawing Sheets

(56) References Cited

U.S. PATENT DOCUMENTS

| | | | | |
|---|---|---|---|---|
| 5,502,638 | A * | 3/1996 | Takenaka | 701/87 |
| 5,570,285 | A * | 10/1996 | Asaka et al. | 701/23 |
| 5,758,298 | A * | 5/1998 | Guldner | 701/23 |
| 6,493,607 | B1 * | 12/2002 | Bourne et al. | 700/255 |
| 6,548,982 | B1 * | 4/2003 | Papanikolopoulos et al. | 318/568.11 |
| 8,068,935 | B2 * | 11/2011 | Kanayama | 700/245 |
| 8,419,804 | B2 * | 4/2013 | Herr et al. | 623/24 |
| 2004/0230340 | A1 * | 11/2004 | Fukuchi et al. | 700/245 |
| 2005/0171644 | A1 * | 8/2005 | Tani | 700/253 |
| 2005/0251291 | A1 * | 11/2005 | Solomon | 700/245 |
| 2006/0241827 | A1 | 10/2006 | Fukuchi et al. | |
| 2006/0293792 | A1 * | 12/2006 | Hasegawa et al. | 700/245 |
| 2008/0009965 | A1 * | 1/2008 | Bruemmer et al. | 700/245 |
| 2008/0086241 | A1 * | 4/2008 | Phillips et al. | 701/2 |
| 2008/0312771 | A1 * | 12/2008 | Sugiura | 700/259 |
| 2009/0024250 | A1 * | 1/2009 | Oaki et al. | 700/245 |
| 2009/0254235 | A1 * | 10/2009 | Kuroda | 701/23 |
| 2010/0168950 | A1 * | 7/2010 | Nagano | 701/25 |
| 2010/0286824 | A1 * | 11/2010 | Solomon | 700/248 |
| 2011/0054689 | A1 * | 3/2011 | Nielsen et al. | 700/258 |
| 2011/0166737 | A1 * | 7/2011 | Tanaka et al. | 701/25 |
| 2011/0271469 | A1 * | 11/2011 | Ziegler et al. | 15/97.1 |
| 2012/0311810 | A1 * | 12/2012 | Gilbert et al. | 15/320 |

FOREIGN PATENT DOCUMENTS

| | | |
|---|---|---|
| JP | 2-170205 | 7/1990 |
| JP | 2003-330542 | 11/2003 |
| JP | 2005-310043 | 11/2005 |
| JP | 2006-053731 | 2/2006 |
| JP | 2006-239844 | 9/2006 |
| JP | 2007-148595 | 6/2007 |
| JP | 2009-223812 | 10/2009 |
| JP | 2009-233757 | 10/2009 |

OTHER PUBLICATIONS

Suzuki et al., "Obstacle Avoidance Considering Robot's Size for an Autonomous Omni-directional Mobile Robot by Simultaneous Control of Translational and Rotational Motions", Sep. 22-24, 2010.

Khatib, "Real-Time Obstacle Avoidance for Manipulators and Mobile Robots," The International Journal of Robotics Research vol. 5, No. 1, Spring 1986.

Suzuki et al., "Obstacle Avoidance Considering Robot's Size for an Autonomous Omni-Directional Mobile Robot by Simultaneous Control of Translational and Rotational Motions," The Japan Society of Mechanical Engineers pp. 385-394 (2010).

Masayuki Hoshina, An Autonomous Mobile and Its Control Method, Application for Patent 2009-264575, Jul. 10, 2009.

* cited by examiner

Prior Art

AUTONOMOUS MOBILE BODY AND CONTROL METHOD OF SAME

CROSS REFERENCE TO RELATED APPLICATIONS

The present application is the U.S. national stage of PCT/JP2010/069985, filed on Nov. 10, 2010, published as WO2011/062095, which claims priority to Japanese priority application number 2009-264575, filed on Nov. 20, 2009, whose content is incorporated herein by reference in its entirety.

TECHNICAL FIELD

The present invention relates to autonomous mobile bodies such as robots and auto-guided vehicles, and to controlling the movement thereof.

BACKGROUND ART

Mobile bodies such as robots that provide various services in real environments where there are people such as offices and factories are being developed, with development of such robots being premised on the robots moving autonomously to a destination while avoiding obstacles. Non-patent Literature 1 discloses an artificial potential field approach regarding obstacle avoidance. According to this artificial potential field approach, an attractive potential for the destination and repulsive potentials for obstacles to be avoided are generated, and control is implemented according to the gradients of the potential field on which these potentials are superimposed. Traction motors are driven in accordance with this control, and the mobile body arrives at its destination while avoiding obstacles.

When avoiding obstacles, the mobile body desirably avoids the obstacles flexibly without taking a long way around. Obstacles occur in areas other than walls and pillars such as passageways and the like through which the mobile body is capable of passing, although those areas are not always wide enough. In view of this, it is desirable that obstacles are flexibly avoided, that is, that if there is a gap through which the mobile body is able to pass by changing its orientation, the mobile body will pass through even a narrow gap and take smooth evasive action. However, since most research to date has involved searching for a movement path using models approximating a mobile body to a circle, no consideration whatsoever has been given to changing the orientation of the mobile body. In other words, with existing techniques that approximate a mobile body to a circular model, a circular model that completely contains the long side of the mobile body is configured even if the mobile body is elongated in plan view, and therefore a gap through which the mobile body could pass if it were to move forward with its short side facing the front will be determined to be impassable, resulting in the mobile body avoiding obstacles by taking a big detour.

CITATION LIST

Non-Patent Literature

Non-patent Literature 1: O. Khatib: "Real-Time Obstacle Avoidance for Manipulators and Mobile Robots," International Journal of Robotics Research, vol. 5, no. 1, pp. 90-98, 1986.

SUMMARY OF THE INVENTION

An object of the invention is to enable an autonomous mobile body to avoid obstacles flexibly.

An autonomous mobile body of the invention is an autonomous mobile body configured to avoid an obstacle and move autonomously to a goal, including:

a platform vehicle having a movement mechanism configured to translate in a horizontal plane and rotate around a vertical axis;

an obstacle sensor for deriving a distance to an obstacle for each directional angle;

a potential generator for generating a translational potential of the mobile body and a rotational potential of the mobile body for avoiding interference with the obstacle, based on the distance from the autonomous mobile body to the obstacle at each directional angle;

a control amount generator for generating an amount of control relating to a translational direction and a translational velocity of the mobile body and an amount of control relating to a rotational direction and an angular velocity of the mobile body, based on the generated potentials; and a drive controller for combining the generated amounts of control and driving the movement mechanism.

A control method of an autonomous mobile body of the invention is a method of controlling movement of an autonomous mobile body configured to avoid an obstacle and move autonomously to a goal, the mobile body having a movement mechanism configured to translate in a horizontal plane and rotate around a vertical axis, the method causing the mobile body to perform the steps of:

deriving a distance from the autonomous mobile body to an obstacle for each directional angle using an obstacle sensor;

generating a translational potential of the mobile body and a rotational potential of the mobile body for avoiding interference with the obstacle, based on the distance from the autonomous mobile body to the obstacle at each directional angle;

generating an amount of control relating to a translational direction and a translational velocity of the mobile body and an amount of control relating to a rotational direction and an angular velocity of the mobile body, based on the generated potentials; and combining the generated amounts of control and driving the movement mechanism.

In the invention, an autonomous mobile body is processed as a body with anisotropy and having a major axis and a minor axis, rather than being approximated with a circle or a point. With regard to the relationship with an obstacle, potentials are generated for each directional angle, and because the robot has rotational degrees of freedom in addition to translational degrees of freedom, potentials are generated for both translation and rotation. Amounts of translational and rotational motion control are generated based on the respective potentials, and obstacles are avoided when the movement mechanism is driven based on these amounts of control. For example, in the case where there is no way through whichever direction it translates, the robot decelerates or stops, while rotating at the same time to avoid the obstacle. Accordingly, the robot is able to pass through small gaps and flexibly avoid obstacles. Combining amounts of control refers to combining the amount of translational motion control and the amount of rotational motion control, and thereby converting the amounts of control to control on the movement mechanism.

Preferably the potentials are potential membership functions according to a fuzzy potential method, the translational potential membership function representing a degree of interference with the obstacle at each translational direction angle, and the rotational potential membership function representing a degree of interference with the obstacle at each rotational direction angle. With the fuzzy potential method, a plurality of basic actions, such as translation and rotation, for example, are respectively represented using potential membership functions (PMFs), and by integrating these membership functions using fuzzy operations, a velocity vector (velocity command) that takes the basic actions into consideration is decided.

The control amount generator may decide a translational velocity between a highest translational velocity and a lowest translational velocity, and decide an angular velocity between a highest angular velocity and a lowest angular velocity, based on values of the potential membership functions. According to this configuration, the translational velocity and angular velocity are easily decided, and, moreover, the robot avoids obstacles carefully by decelerating so as to avoid interference with the obstacles.

The potential generator may generate translational and rotational potential membership functions for each of a plurality of obstacles, generate translational and rotational potential membership functions for guiding the autonomous mobile body to a destination, and combine the potential membership functions for the obstacles with the potential membership functions for the destination respectively for translation and rotation. Accordingly, interference with a plurality of obstacles is avoided and the robot is guided to a destination with a single potential membership function each for translation and rotation.

The combining of translational potential membership functions may involve deriving, for each directional angle, a highest value or a lowest value from a result of combining the plurality of translational potential membership functions, and the combining of rotational potential membership functions involves deriving, for each directional angle, a highest value or a lowest value from a result of combining the plurality of rotational potential membership functions. According to this configuration, potential membership functions are easily combined.

Preferably, the control amount generator derives the amount of translational control and the amount of rotational control independently. According to this configuration, respective amounts of control are easily generated by disregarding interaction between translation and rotation. Combining the generated amounts of control most preferably involves summing the amount of translational control and the amount of rotational control. According to this configuration, the movement mechanism is easily driven by the summation of amounts of control.

Preferably, the movement mechanism has three or more drive wheels each provided, on a perimeter thereof, with a roller configured to rotate in a direction parallel to a wheel axis, and the three or more drive wheels including a drive wheel having a different wheel axis direction.

DETAILED DESCRIPTION OF THE INVENTION

Hereinafter an optimal embodiment for carrying out the present invention will be described. The scope of the invention shall be determined according to the understanding of a person skilled in the art based on the description of the claims in consideration of the description of the specification and techniques known in this technical field.

Figure 1:
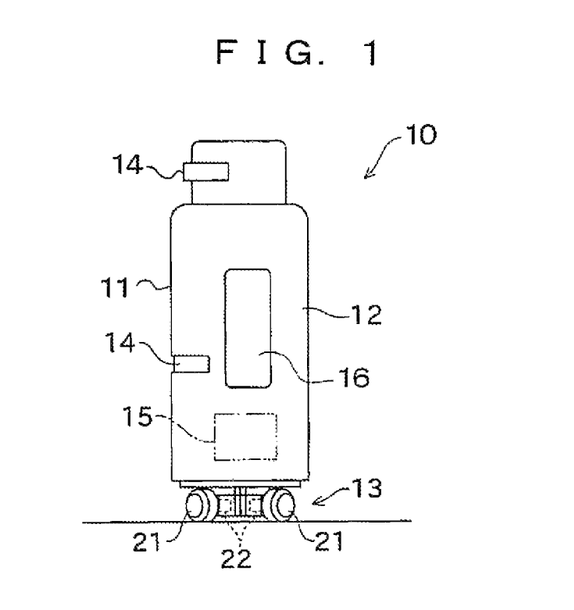
FIG. 1 is a side view of an autonomous mobile robot according to an embodiment.

FIGS. 1 to 22 show an autonomous mobile robot 10 and control thereof according to an embodiment. Referring to FIG. 1, the robot 10 includes a platform vehicle 13 provided with an omni-directional movement mechanism, with the platform vehicle 13 supporting an upper part 12 serving as an upper body. The upper part 12 is provided with a pair of, for example, laser range finders 14, each of which is attached at a different height. A stereoscopic device such as a stereo camera, light sources and cameras for space coding, or the like may be provided instead of the laser range finders 14. With the above configuration, the robot 10 acquires, at a number of heights, information indicating the distance between the robot and obstacles for each of predetermined directional angles, and outputs the distance information. The robot 10 may recognize its current position and orientation by being equipped with GPS or the like (not shown), or may alternatively recognize its current position and orientation in accordance with information indicating the distance to a passage wall or the like sensed by the laser range finders 14, a stereoscopic device or the like and an environmental map prepared in advance. The upper part 12 includes a controller 15 and working arms 16. Note that the upper part 12 may be configured to rotate around a vertical axis relative to the platform vehicle 13.

Figure 2:
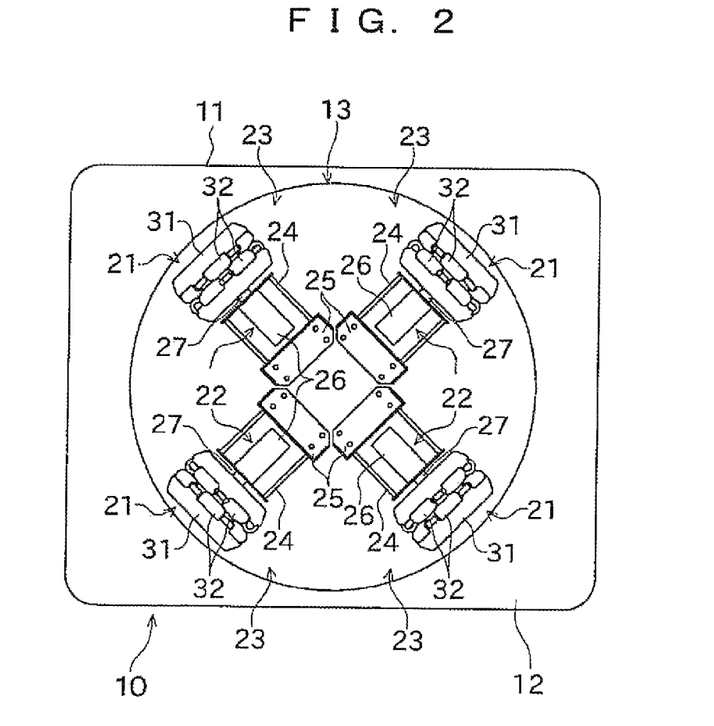
FIG. 2 is a bottom view of the autonomous mobile robot according to the embodiment.

The omni-directional movement mechanism of the platform vehicle 13 according to the embodiment is provided with four omni-directional wheels 21 that are disposed at 90 degree intervals in the circumferential direction, and four motors 22 that drive the omni-directional wheels 21. Note that the platform vehicle 13 may be configured with three or six sets of omni-directional wheels 21 and motors 22. Reference numeral 23 denotes a wheel drive unit, with the wheel drive unit 23 being provided with support frames 24 and the motors 22 fixed to the support frames 24, and the support frames 24 being fixed to the platform vehicle 13 by brackets 25. The platform vehicle 13 moves freely in the X and Y directions, and rotates freely around the vertical axis. Note that while the type of omni-directional movement mechanism is arbitrary, in the embodiment the omni-directional movement mechanism is required to translate and rotate in arbitrary directions with a substantially zero turning radius. Hereinafter, the omni-directional movement mechanism is described.

Figure 6:
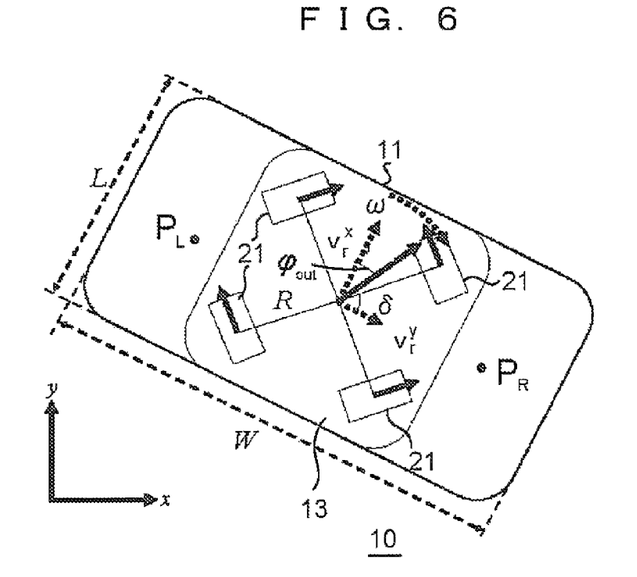
FIG. 6 is a view showing a relation between a capsule case and traction wheels of the robot according to the embodiment.

The motors 22 are each provided with a housing 26, and an output axis 27 of each motor 22 projects outward from the support frame 24 and rotates the omni-directional wheel 21. The omni-directional wheels 21 are disposed such that rotation axes (wheel axes) thereof are at an angle of 45 or 135 degrees to a front surface 11 of the robot 10. As shown in FIGS. 2 and 6, the robot 10, in plan view, has a substantially rectangular shape, with width W along the front surface 11 being greater than length L.

The omni-directional wheels 21 are each provided with a drive wheel 31 driven by the output axis 27 of the motor 22, and a plurality of free rollers 32 annularly disposed along the perimeter of the drive wheel 31. The outer periphery of one of the plurality of free rollers 32 is always in contact with the floor, and the rotation axis lines of the free rollers 32 are perpendicular to the rotation axis line of the drive wheel. When the motor 22 rotates the drive wheel, a driving force is transferred to the floor by the free rollers 32. Also, because the free rollers 32 are freely rotatable centered on the rotation axis line, the omni-directional wheel 21 is also able to move in a direction parallel to the rotation axis of the drive wheel. Note that metal balls or the like may be used instead of the free rollers 32.

Figure 3:
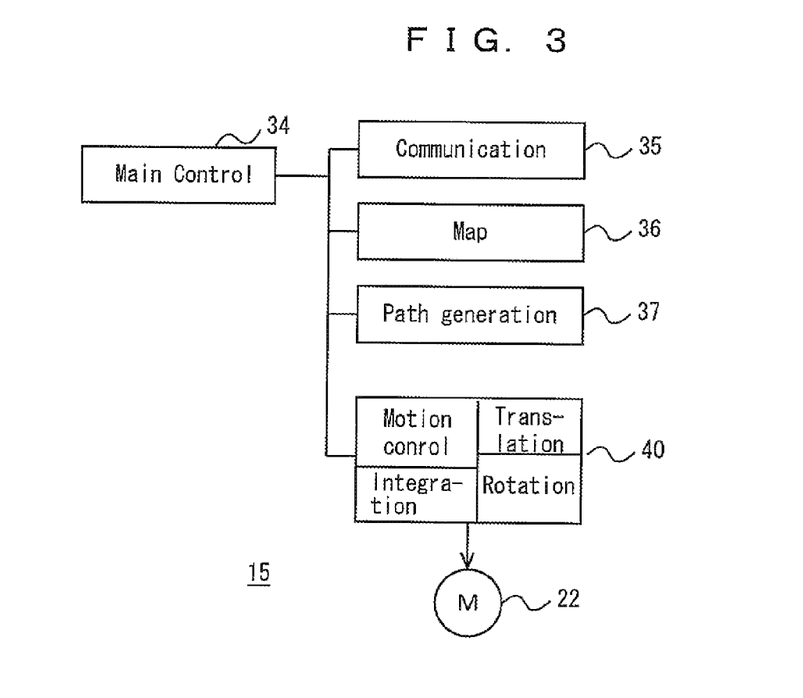
FIG. 3 is a block diagram showing a movement control system in the autonomous mobile robot according to the embodiment.

The movement controller 15 according to the embodiment is shown in FIG. 3. Reference numeral 34 denotes a main controller, which consists of a CPU, a ROM, a RAM and the like. Reference numeral 35 denotes an input unit, and an operator inputs a goal of the robot 10, various parameters of the anisotropic model (capsule case model) discussed later, maximum and minimum translational velocities of the robot 10, maximum and minimum angular velocities of the robot 10, and the like, via the input unit 35. Reference numeral 36 denotes a map storage unit, which stores an environmental map of the environment in which the robot 10 can move. Reference numeral 37 denotes a path generator, which generates a movement path to the destination with reference to the environmental map. Reference numeral 40 denotes a motion controller, which generates translational control commands and rotational control commands, and outputs these control commands as velocity commands (individual velocity commands) to each of the motors 22 in FIG. 2.

Figure 4:
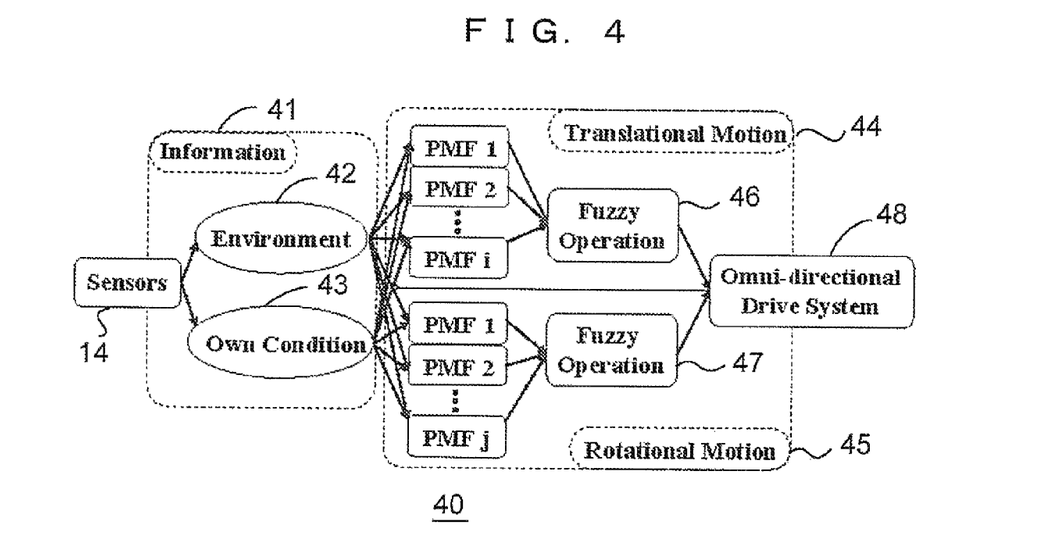
FIG. 4 is a block diagram of a motion controller shown in FIG. 3.

FIG. 4 shows a conceptual block diagram of the motion controller 40, which receives input of distance information for each directional angle from sensors such as the laser range finders 14, and, based on the distance information, acquires information relating to the directional angle at which the front surface of the robot is oriented as well as the robot's current position, and information relating to obstacles in the vicinity thereof. Relocatable obstacles such as desks and cabinets and moving obstacles such as people (hereinafter, collectively referred to as temporary obstacles), excluding preexisting obstacles such as walls and pillars, are generally not indicated on environmental maps, and the first time that the robot 10 will be able to recognize where temporary obstacles are located in its movement environment such as a passageway is when distance information is input from a sensor. Reference numeral 41 denotes a data processor, which includes an environmental data processor 42 for processing environmental data relating to obstacles, destinations and the like, and an own data processor 43 for processing own data relating to the robot's own condition such as its current position, orientation, velocity and so on, with the own data processor 43 generating a capsule case model discussed below from input parameters and storing the generated capsule case model.

As discussed later, because a capsule case model can be defined by three parameters $C_a$, $C_R$ and $C_L$, these parameters are stored or the capsule case model itself is stored. Also, when taking into consideration the fact that the shape of the autonomous mobile body differs in the height direction and the shape of obstacles differs in the height direction, a plurality of sets of parameters are stored according to height, and a plurality of capsule case models are output and stored. Furthermore, in the case where the shape of the upper body of the autonomous mobile body differs from the platform vehicle or legs, the above parameters change according to height, and the capsule case model for the upper body changes.

Referring to FIG. 4, a translational motion controller 44 and a rotational motion controller 45 are provided in parallel downstream of the data processor 41, and controls from these controllers are integrated by a driving command generator 48, and used to control the velocity of the motors 22. The translational motion controller 44 and the rotational motion controller 45 generate potential membership functions (PMFs) for translational motion control and potential membership functions (PMFs) for rotational motion control, according to information including the position and size of obstacles and the like, the destination, and the robot's own current position and orientation stored in the data processor 41. Note that PMFs are generated for each obstacle and destination, and combined in fuzzy processors 46 and 47.

Based on the combined potential membership function (PMF), translational orientation and translational velocity are decided with the fuzzy processor 46, and data indicating how much to change the orientation of the platform vehicle 13, or in other words, rotational direction and angular velocity are decided with the fuzzy processor 47. The translational orientation and velocity and the direction and angular velocity of rotation of the platform vehicle are thereby determined, and this data is converted by the driving command generator 48 into controls on the four motors.

The shape of a robot is, generally speaking, not uniform in the height direction according to its design and function. Furthermore, the shape of a robot changes temporally due to the arms projecting from the upper part, as well as factors such as the upper part of the robot turning relative to the platform vehicle and the arms extending or retracting. Obstacles are also not necessarily uniform in the height direction. In view of this a plurality of potential membership functions (PMFs) preferably are prepared according to height.

Figure 5:
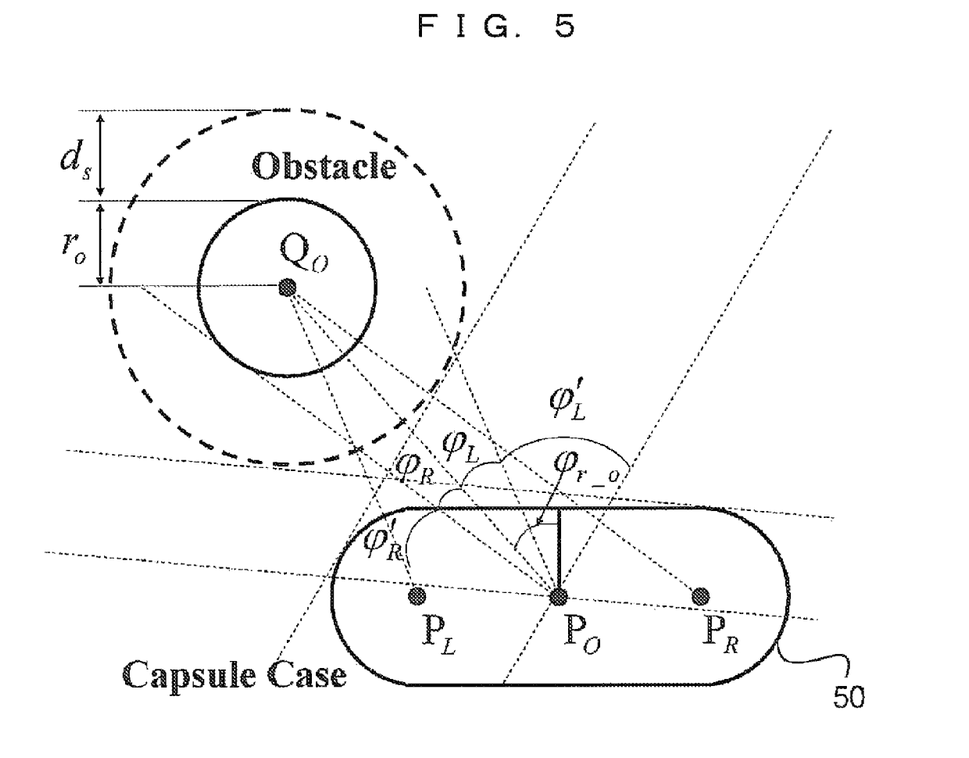
FIG. 5 is a plan view illustrating a capsule case model and angles for PMF generation in the embodiment.

A capsule case model for a robot is shown in FIGS. 5 and 6. A capsule case 50 is formed by connecting both ends of a pair of line segments arranged in parallel at an opposing distance $2C_a$ with semicircles of radius $C_a$. $P_L$ and $P_R$ are the centers of the semicircles, $P_0$ is the center of the platform vehicle, and $C_L$ and $C_R$ are the distances from the center of the platform vehicle to the points $P_L$ and $P_R$. Normally $C_L=C_R$ is set, but $C_L$ and $C_R$ may also differ according to variation in the shape of the robot 10 due to factors such as the arms extending or retracting. $C_a$ is slightly larger than one half of the depth length of the robot, for example, but may increase beyond its normal value due to factors such as the arms extending or retracting or a wagon being towed. In FIG. 5, for example, an obstacle O (whose center is $O_0$) is approximated with a circle in which the obstacle is completely contained, and the radius of the obstacle is $r_O$. A safe distance $d_S$ is a parameter that is introduced in order to maintain a distance between the robot 10 and the obstacle and ensure safety.

$\psi_{r\_o}$ in FIG. 5 is the direction of the obstacle relative to the front surface of the platform vehicle when the obstacle is viewed from the center of the platform vehicle. $\psi_L$ is the angle formed by a line segment passing through the center $P_0$ in parallel to a line segment connecting $P_L$ and $O_0$, and a line segment connecting $P_0$ and $O_0$. $\psi_R$ is the angle formed by a line segment passing through the center $P_0$ in parallel to a line segment connecting $P_R$ and $O_0$, and the line segment connecting $P_0$ and $O_0$. $\psi_{L'}$ is the angle formed by the line segment passing through the center $P_0$ in parallel to the line segment connecting $P_L$ and $O_0$, and a line segment passing through the center $P_0$ in parallel to a line segment tangent to both a circular arc centered on $P_L$ and the safety circle of the obstacle. $\psi_{R'}$ is the angle formed by the line segment passing through the center $P_0$ in parallel to the line segment connecting $P_R$ and $O_0$, and a line segment passing through the center $P_0$ in parallel to a line segment tangent to both a circular arc centered on $P_R$ and the safety circle of the obstacle. Furthermore, $\psi_{out}$ in FIG. 6 is the translational direction angle of the platform vehicle from the frontal direction of the platform vehicle.

The capsule case 50 will be described here. As shown in FIG. 6, the capsule case 50 is a graphic that completely contains the robot 10, and is formed by arcs at both ends and line segments connecting the arcs. The capsule case 50 has a major axis and a minor axis, and corresponds to an area occupied by a robot with anisotropy in plan view. With the capsule case 50, the robot's longitudinal direction is represented by line segments, and movement of the robot is represented by movement of these line segments. Both ends of the line segments are connected with semicircles in order to leave degrees of freedom to rotate at arbitrary positions that the robot may find itself in.

Figure 7:
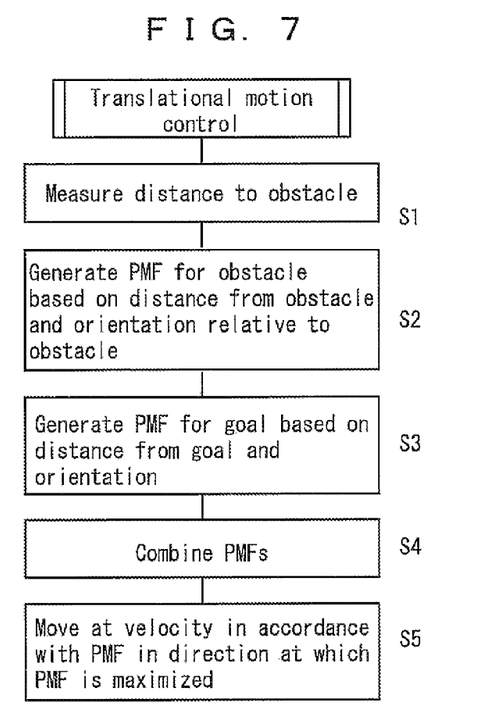
FIG. 7 is a flowchart showing a translational motion control algorithm in the embodiment.

FIGS. 7 to 10 show control of the robot. An algorithm for translational motion control is shown in FIG. 7, with the distance to an obstacle being measured for each directional angle at Step 1. When the distance from the robot to an obstacle is measured with the directional angle as a variable, the surface of the obstacle visible from the robot 10 can be approximated to a circle, a wall, a cube or the like. In the case of a circle, the safe distance $d_s$ is determined as shown in FIG. 5, and in the case of a wall, the safe distance $d_s$ is determined for only the front of the wall. In the case of a cube, the safe distance $d_s$ is determined parallel to the sides, and the area around the vertices is approximated with a circular arc of radius $d_s$. A potential membership function (PMF) for the obstacle is created at Step 2, based on the distance from the robot to the obstacle and the robot's orientation relative to the obstacle. At Step 3, a PMF for the destination (goal) is created, based on the distance from the robot to the goal and the robot's orientation. Note that a goal as referred to here is a concept that includes not only the destination at which the robot 10 is to finally arrive, but also places (sub-goals) along the path that the robot 10 is to take.

The PMF for the obstacle and PMF for the goal are combined at Step 4, and in the case of there being a plurality of obstacles, all the PMFs for the plurality of obstacles are combined with the PMF for the goal. When combining PMFs, PMF values on the low side are employed for each directional angle, for example. Note that in this specification, a high translational potential means a stable state with low repulsion, and the robot translates in the direction at which the PMF is maximized. Also, the velocity of the robot is restricted using the PMF, with a velocity between the maximum and minimum velocities being taken, and the velocity increasing the higher the PMF. A translational velocity v is given by $v=\Delta v \times f+v_{min}$, where the minimum velocity is 0, for example, $\Delta v$ is the difference between the maximum velocity $v_{max}$ and the minimum velocity $v_{min}$, f is the PMF value, and the value of f is in a range of 0 to 1 inclusive. When these values have been derived, the robot decides the translational direction so as to avoid the obstacle and decelerates near the obstacle (Step 5).

Figure 8:
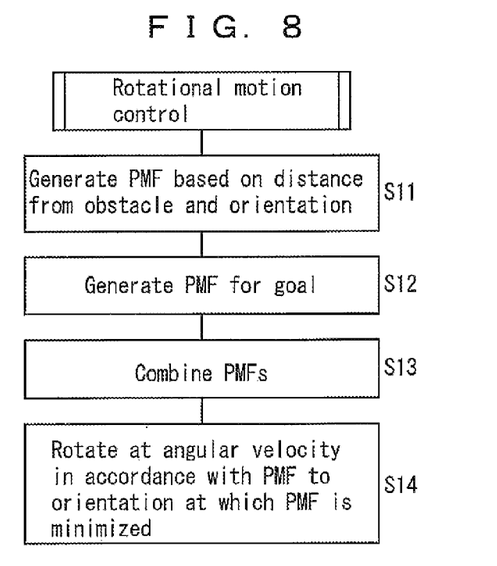
FIG. 8 is a flowchart showing a rotational motion control algorithm in the embodiment.

Rotational motion control is shown in FIG. 8, with data relating to the distance to the obstacle and the orientation of the robot relative to the obstacle having already been acquired at Steps 1 and 2 of FIG. 7. At Step 11 of FIG. 8, a rotational PMF is created, based on the distance from the robot to the obstacle at each directional angle, and the orientation (frontal direction) of the robot, similarly to Step 3 of FIG. 7. The rotational PMF shows how the repulsion (potential value) from the obstacle changes depending on the direction in which the robot is facing. At Step 12, a PMF for the goal is created, and assuming that it is desirable for the robot to be facing the front when it arrives at the goal, for example, the PMF is lowest at the orientation at which the goal is in front of the robot, and increases the further the robot is displaced from this orientation. Moreover, it needs to be kept in mind that interpretation of PMF values is reversed for translation and rotation. The PMF for the obstacle and the PMF for the goal are combined at Step 13, and in the case of there being a plurality of obstacles, all the PMFs for the plurality of obstacles are combined with the PMF for the goal. The robot rotates at an angular velocity in accordance with the PMF to an orientation at which the PMF is minimized (Step 14). An angular velocity $\omega$ is given by $\omega=\Delta\omega \times (1-f)+\omega_{min}$, where the minimum angular velocity $\omega_{min}$ is 0, for example, $\Delta\omega$ is the difference between the maximum angular velocity $\omega_{max}$ and minimum velocity $\omega_{min}$, f is the PMF value, and the value of f is in a range of 0 to 1 inclusive.

Figure 9:
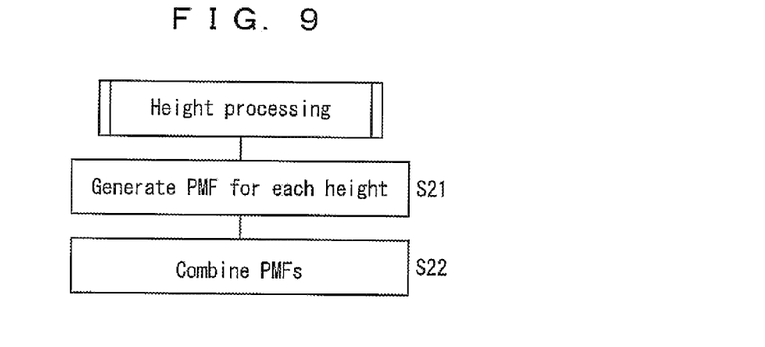
FIG. 9 is a flowchart showing incorporation of height into a PMF in the embodiment.

Height processing is shown in FIG. 9, this being processing for when the surface of the obstacle is not uniform in the height direction, or when the surface of the robot is not uniform in the height direction. For example, the laser range finders 14 are provided at a plurality of heights in FIG. 1, and a PMF for each height is thereby generated (Step 21). The plurality of PMFs are then combined to form a single PMF, similarly to the combining of PMFs in FIG. 7 and FIG. 8, for example, or the plurality of PMFs according to height are left as they are.

Figure 10:
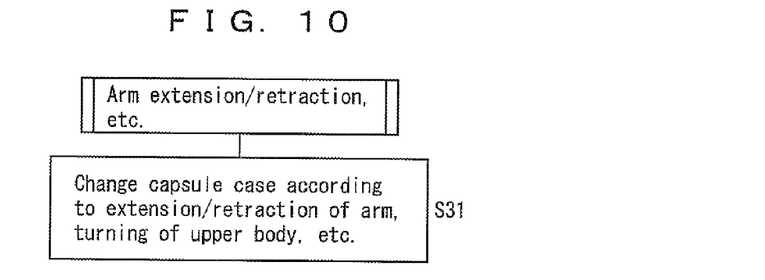
FIG. 10 is a flowchart showing incorporation of factors such as arm extension/retraction into a PMF in the embodiment.

FIG. 10 shows processing of the influence of factors such as the arms extending or retracting. When the robot extends or retracts an arm, inclines the upper part, or the like, the capsule case model to be applied is changed accordingly. The capsule case model is changed by changing the parameters $C_1$, $C_R$ and $C_L$, and because PMFs are generated in real-time each time, PMFs only have to be generated based on the new capsule case model. As a result of the processing in FIGS. 9 and 10, the robot can efficiently avoid obstacles even if the orientation of the robot is changed, the surface of the robot is not uniform in the height direction or obstacles are not uniform in the height direction. Furthermore, in the case where the robot tows a wagon, it is favorable to change the orientation of the major axis and the minor axis as viewed from the front surface of the robot, and change the parameters $C_a$, $C_R$ and $C_L$, for example.

Figure 11:
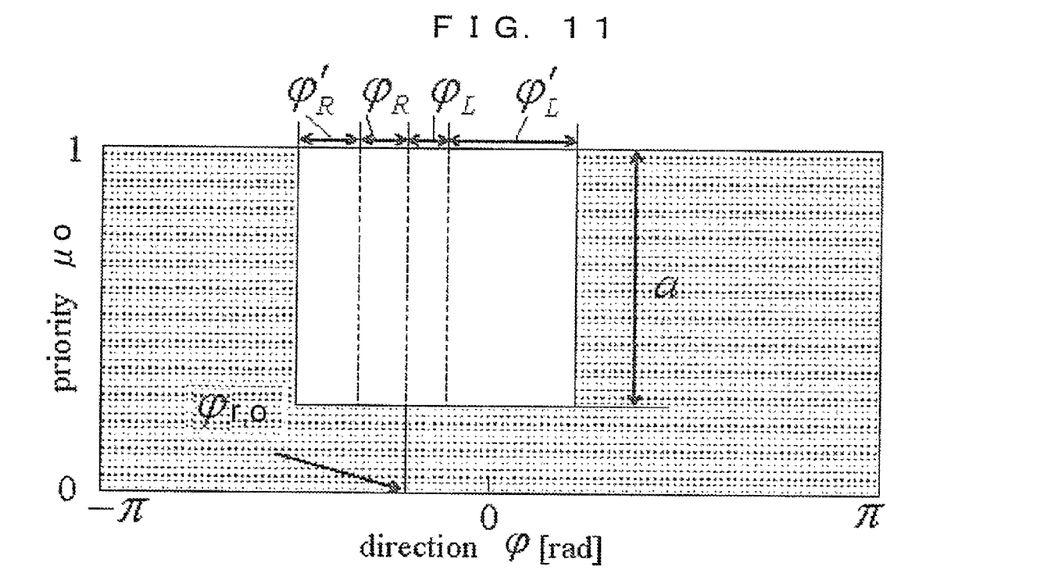
FIG. 11 is a view showing an exemplary obstacle PMF for translation.
Figure 12:
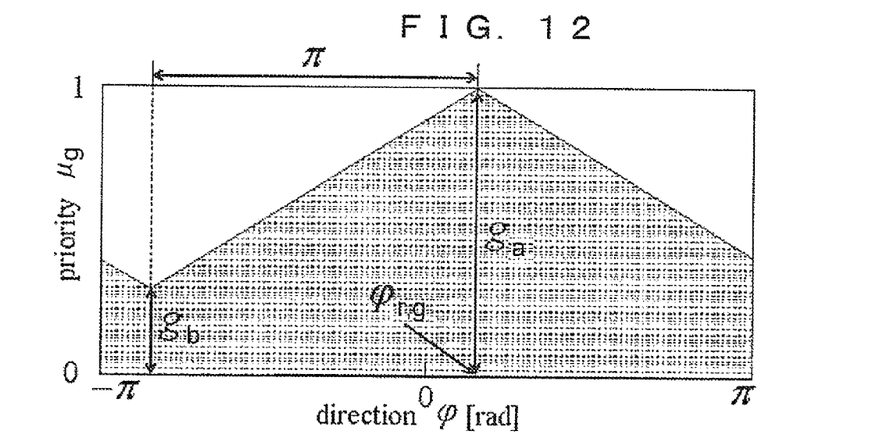
FIG. 12 is a view showing an exemplary goal PMF for translation.
Figure 13:
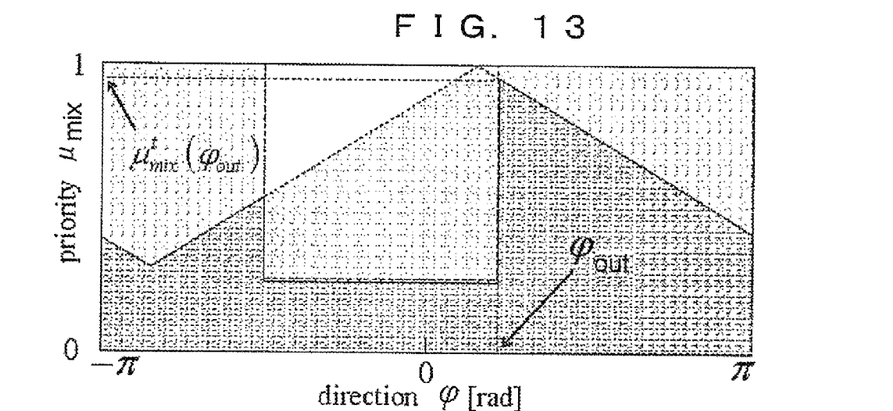
FIG. 13 is a view showing an exemplary combined obstacle-goal PMF for translation.

FIGS. 11 to 13 show exemplary PMFs for translation when the obstacle and the robot 10 are in the positional relationship shown in FIG. 5. FIG. 11 shows a PMF for the obstacle, with the vertical axis showing priority that indicates desirability as a translational direction and the horizontal axis representing translational direction angle. The robot moves forward while facing the front at directional angle 0. A parameter "a" takes a value between 0 and 1, with a being 0 if there is no influence from the obstacle, and approaching 1 as the influence of the obstacle increases, and the valley in the middle of FIG. 11 deepening as a result. The valley slopes vertically in FIG. 11 but may slope more gently. The variable "a" is defined as shown in equation (1) when a distance $\|r_{r,o}\|$ of the obstacle to the center of the robot falls below a radius α. Here, D is defined by equation (2) using the parameters $C_a$, $r_o$ and $d_s$ of FIG. 5:

$$a=(\alpha-\|r_{r,o}\|)/(\alpha-D) \text{ if } \|r_{r,o}\|<\alpha; \quad (1)$$

$$D=C_a+r_o+d_s \quad (2)$$

As mentioned above, at positions that are not influenced by the obstacle, the priority $\mu_o$ of the vertical axis is 1, and at positions that are influenced by the obstacle, the priority $\mu_o$ falls by "a" at directional angles that are affected. In FIG. 11, the robot is influenced by the obstacle at the valley in the middle, and moves forward on either side of the valley.

FIG. 12 shows a PMF for the goal, with the PMF value being fixed at 1 if the robot is beyond a certain distance from the goal, which indicates that there is no influence from the goal. When the robot moves within a range that is affected by the goal, the priority at a desirable orientation $\psi_{rg}$ relative to the goal will be $g_a$, which is the maximum value 1, for example, and the priority at an undesirable orientation will be a small value $g_b$. It is arbitrary whether the robot approaches the goal along a path generated by the path generator, using the PMF for the goal as a short distance field, or whether the robot is guided to the goal at intermediate positions along the path, using the PMF for the goal as a long distance field.

The PMF in FIG. 13 is obtained when a plurality of PMFs are combined so as to extract values on the low side. The direction at which the value of the combined PMF is maximized is a convenient direction for the robot, and translational velocity is determined by the priority of that directional angle. That is, the permitted velocity is high if the priority is high, and the velocity decreases when the priority is low. In the case of FIG. 13, the robot translationally moves at a directional angle $\psi_{out}$ at a velocity substantially equal to the highest velocity.

Figure 14:
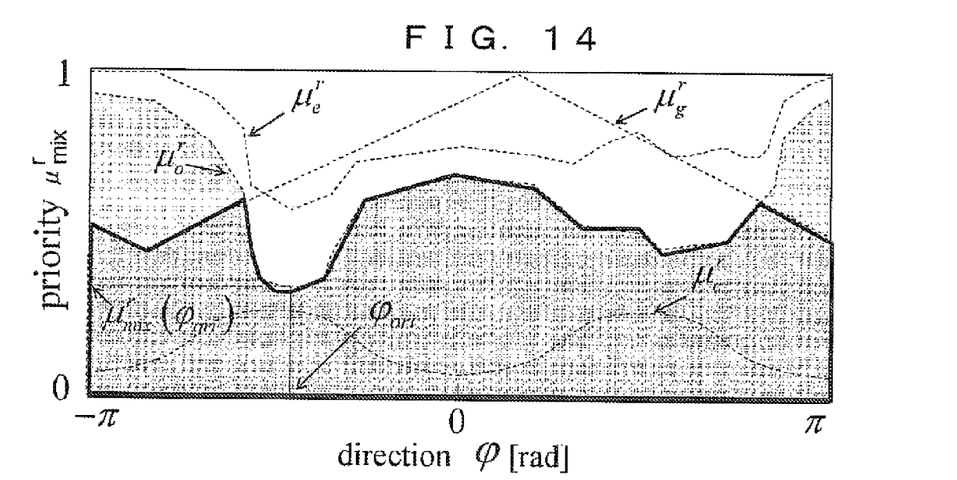
FIG. 14 is a view showing an exemplary combined obstacle-goal PMF for rotation.

FIG. 14 shows a PMF for rotation. While the robot will move forward in the direction of the highest PMF in the PMF for translation, in the case of rotation the robot is oriented in the direction at which the PMF is minimized. This is a convention relating to PMFs. Let the PMF for the obstacle be $\mu_e^r$, and the PMF relating to the orientation of the robot be $\mu_c^r$. Then, let the difference therebetween be $\mu_o^r$, with this being the combined PMF relating to the obstacle. $\mu_e^r$ shows orientations at which the influence of the obstacle increases as seen from the robot, with $\mu_c^r$ being generated based on distance data obtained from a distance measurement sensor such as an ultrasonic sensor or a laser range finder, and obtained by dividing the distance from the center of the robot to the obstacle in all directions by the maximum distance used in measurement by the distance measurement sensor. $\mu_c^r$ shows orientations in which the robot is likely to be affected by the obstacle when facing in that direction, and, specifically, is obtained by dividing the length from the central point $P_o$ of the capsule case to the outer contour thereof by the maximum distance used in measurement by the distance measurement sensor. Let the PMF for the goal be $\mu_g^r$. The result of choosing the smaller of $\mu_o^r$ and $\mu_g^r$ is the solid line in FIG. 14, with this being the combined PMF. As such, this PMF is smoothed, for example, with the orientation in which the PMF is minimized being an orientation of rotation $\psi_{ori}$, and the angular velocity of rotation being higher the lower the priority at $\psi_{ori}$ and lower the higher the priority at $\psi_{ori}$.

Even though an amount of translational motion control and an amount of rotational motion control are obtained, the omni-directional movement mechanism does not execute translation and rotation separately. The amount of translational motion control (direction and velocity of translation), and the amount of rotational motion control (orientation and angular velocity of rotation) are combined in the driving command generator, and used to control the motors. With regard to translation, let the absolute velocity be $v_{out}$, the direction be $\psi_{out}$, and the angular velocity be ω. Translational velocity along the x-axis is given by $v_r^x=v_{out}\cos\psi_{out}$, and translational velocity along the y-axis is given by $v_r^y=v_{out}\sin\psi_{out}$.

Target velocities (controls) $v_1^\omega$, $v_2^\omega$, $v_3^\omega$ and $v_4^\omega$ of the four drive wheels are given by equations (3) to (6) when constants R and δ are defined as shown in FIG. 6:

$$v_1^\omega=\cos\delta\cdot v_r^x+\sin\delta\cdot v_r^y+R\cdot\omega; \quad (3)$$

$$v_2^\omega=\cos\delta\cdot v_r^x-\sin\delta\cdot v_r^y-R\cdot\omega; \quad (4)$$

$$v_3^\omega=-\cos\delta\cdot v_r^x-\sin\delta\cdot v_r^y+R\cdot\omega; \quad (5)$$

$$v_4^\omega=-\cos\delta\cdot v_r^x+\sin\delta\cdot v_r^y-R\cdot\omega. \quad (6)$$

Figure 15:
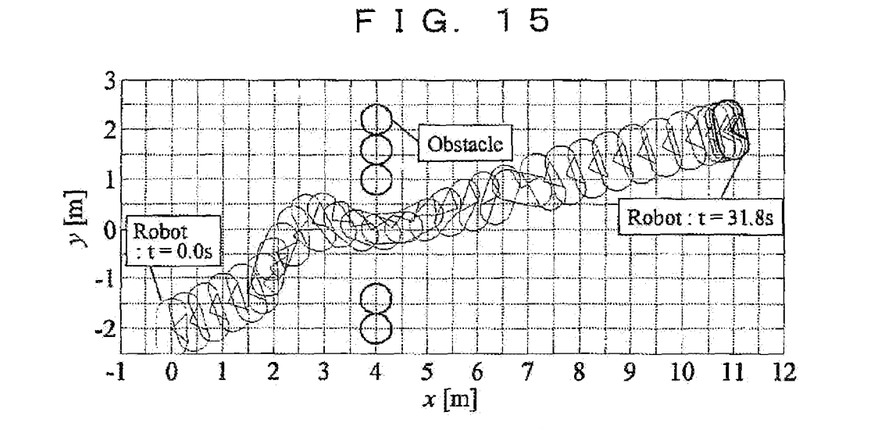
FIG. 15 is a view showing the trajectory of a robot in the embodiment.

FIGS. 15 to 19 show simulation results for the robot 10, with the task being to pass through a gap between obstacles and arrive at a destination. In FIG. 15, the robot has a width W=1.0 m and a length L=0.4 m, and is contained within a capsule case having parameters $C_a$=0.3 m, $C_L$=0.3 m and $C_R$=0.3 m. The obstacles are circles of radius 0.3 m, and simulation is performed on a two-dimensional plane. $r_o$ and $d_s$ are both 0.3 m, and therefore D=0.9 m. $v_{max}$ and $v_{min}$ are respectively 0.5 m/s and 0.0 m/s, and $\omega_{max}$ and $\omega_{min}$ are respectively 1.0 rad/s and 0.0 rad/s. Here, obstacles of radius 0.3 m were disposed at points (4.0 m, −2.0 m), (4.0 m, −1.4 m), (4.0 m, 1.0 m), (4.0 m, 1.6 m) and (4.0 m, 2.2 m), as shown in FIG. 15. In this environment, the robot was moved to a point (11.0 m, 2.0 m) from a starting point (0.0 m, −2.0 m).

Figure 16:
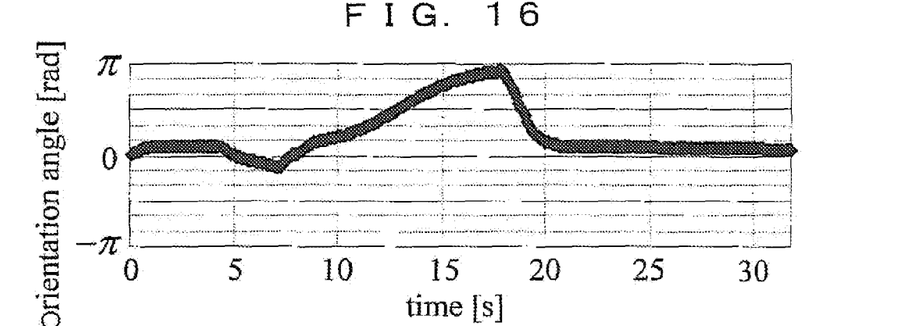
FIG. 16 is a view showing transition of the directional angle of a robot in the embodiment.
Figure 17:
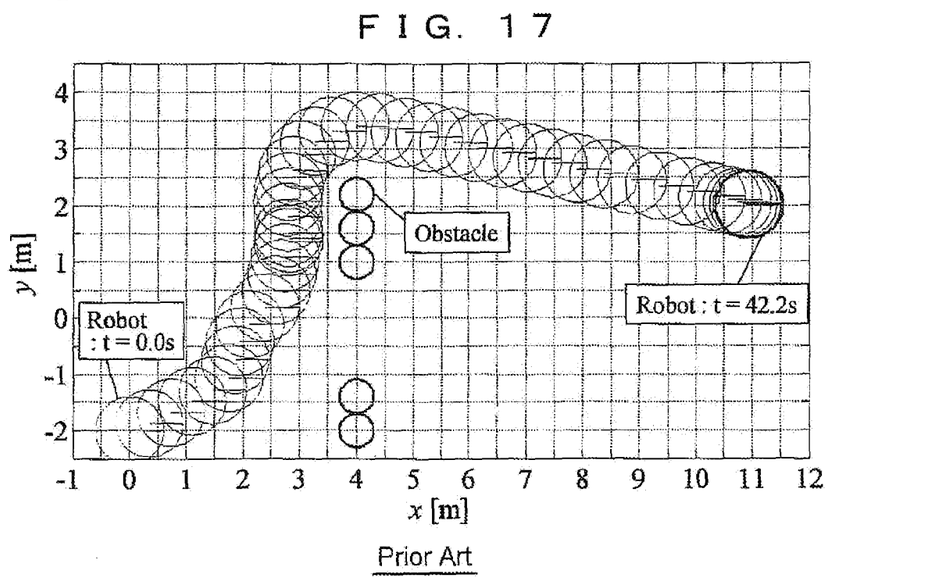
FIG. 17 is a view showing trajectory of a robot in a conventional example.

A trajectory (FIG. 17) of a conventional method that avoids the obstacles when the robot is assumed to be a circle of radius 0.6 m will be compared with a trajectory (FIG. 15) of the robot in the embodiment. Note that the position of the robot was plotted at one second intervals. In the case where evasive action was taken assuming the robot to be a single circle, the robot could not pass between the points (4.0 m, −1.4 m) and (4.0 m, 1.0 m), and arrived at the goal after avoiding the obstacles by taking the long way around, as shown in FIG. 17. In contrast, in the embodiment, the robot passed between obstacles while maintaining a distance from the respective obstacles and arrived at the goal, by changing the directional angle in real-time, as shown in FIG. 15. The arrival time was 42.2 s for the conventional example in which the robot was viewed as a circle, compared with 31.8 s for the embodiment. The history of orientation angles (directional angles of the front surface of the robot from the x direction) of the robot according to the embodiment is shown in FIG. 16.

Figure 18:
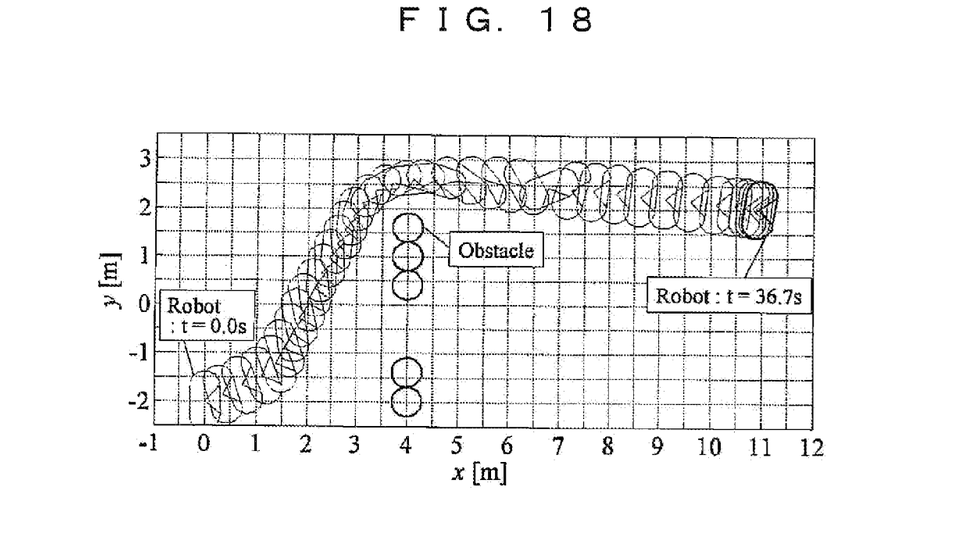
FIG. 18 is a view showing the trajectory of a robot in the embodiment when an interval between obstacles has been narrowed so that the robot cannot pass.
Figure 19:
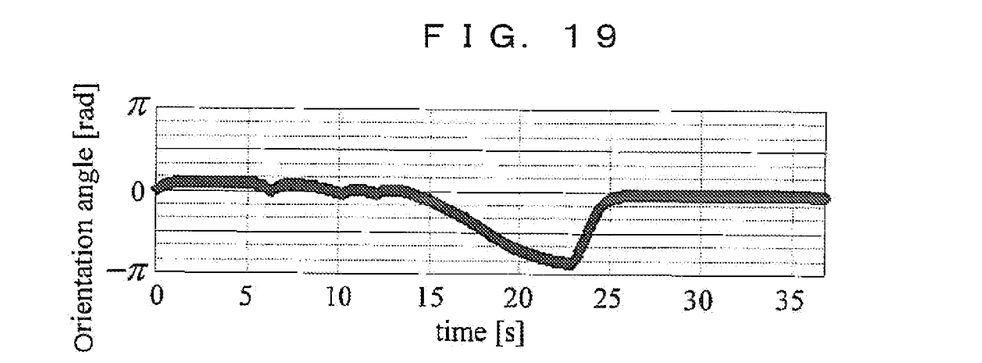
FIG. 19 is a view showing transition of the directional angle of a robot in the embodiment when an interval between obstacles has been narrowed so that the robot cannot pass.

To simulate a situation in which the robot according to the embodiment is not able to pass while maintaining a distance $d_s$=0.3 m from the obstacles whatever its orientation, obstacles were disposed at points (4.0 m, −2.0 m), (4.0 m, −1.4 m), (4.0 m, 0.4 m), (4.0 m, 1.0 m) and (4.0 m, 1.6 m). As shown in FIG. 18, the robot autonomously judged that it could not pass and took the long way around to the goal, without trying to force a path through the gap between the obstacles. The history of orientation angles in this case is shown in FIG. 19.

Figure 20:
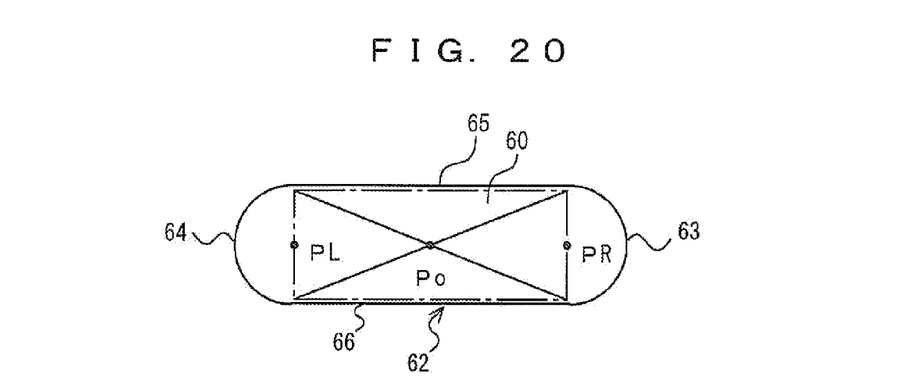
FIG. 20 is a plan view showing a variation of the capsule case model.
Figure 21:
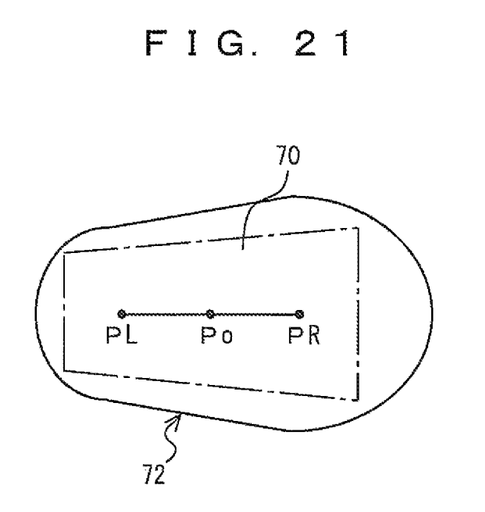
FIG. 21 is a plan view showing a second variation of the capsule case model.
Figure 22:
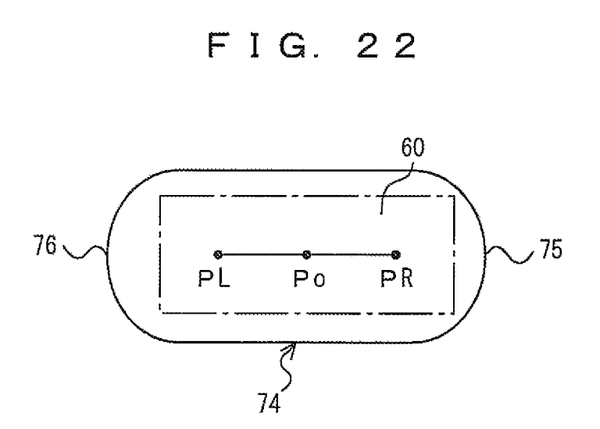
FIG. 22 is a plan view showing a third variation of the capsule case model.

The meaning of the capsule case model will be reiterated with reference to FIGS. 20 to 22. In FIG. 20, a capsule case 62 is provided in relation to an autonomous mobile robot 60, the capsule case having circular arcs 63 and 64 at both ends in the major axis direction of the robot 60, and the centers. $P_R$ and $P_L$ of the circular arcs being at the left and right edges of the robot 60.

An autonomous mobile robot 70 in FIG. 21 is larger on the right side than the left side in plan view, with a capsule case 72 being deformed accordingly such that the circular arc on the right side has a larger radius than the circular arc on left side. With a capsule case 74 in FIG. 22, the circular arcs 75 and 76 are centered within the robot 60. These are all capsule cases.

The following effects are obtained in the embodiment.

1) The robot is treated as a body with anisotropy and having a major axis and a minor axis, rather than being approximated with a circle or a point. With regard to the relationship with an obstacle, potentials are generated for each directional angle, and because the robot has rotational degrees of freedom in addition to translational degrees of freedom, potentials are generated for both translation and rotation. Amounts of translational and rotational motion control are generated based on the respective potentials, and obstacles are avoided when the movement mechanism is driven based on these amounts of control. For example, in the case where there is no way through whichever direction it translates, the robot decelerates or stops, while rotating at the same time to avoid the obstacle. Accordingly, the robot is able to pass through small gaps and smoothly avoid obstacles.

2) Potential membership functions according to a fuzzy potential method are generated comparatively easily, and are suited to real-time processing.

3) A control amount generator decides a translational velocity between a prescribed highest translational velocity and a prescribed lowest translational velocity, and decides an angular velocity between a prescribed highest angular velocity and a prescribed lowest angular velocity, based on values of the potential membership functions. Thus, the translational velocity and angular velocity are easily decided, and, moreover, the robot avoids obstacles carefully by decelerating so as to avoid interference with the obstacles.

4) Potential membership functions for translation and rotation are generated for each of a plurality of obstacles, together with generating a potential membership function for guiding an autonomous robot to a destination, and these potential membership functions are combined. Accordingly, interference with a plurality of obstacles is avoided and the robot is guided to a destination with a single potential membership function each for translation and rotation.

5) Potential membership functions are easily combined, by deriving the highest value and lowest value of the potential membership functions for each directional angle.

6) Respective amounts of translational and rotational motion control are easily generated by disregarding interaction between translation and rotation. If the robot then has trouble translating, it decelerates or stops, and rotates to get away. If it does not need to rotate, the robot only translates. Movement equivalent to coordinating translation and rotation is thus realized.

7) The amount of translational motion control and the amount of rotational motion control are summed to combine the amounts of control. This facilitates driving of the movement mechanism.

8) The platform vehicle according to the embodiment translates and rotates in arbitrary directions with a zero turning radius.

9) Rotational and translational degrees of freedom are both maintained at arbitrary positions using a capsule case model, and it is thus easy to change the robot's orientation while avoiding obstacles.

10) Even if the surface of the robot is not uniform in the height direction or the surface of obstacles changes in the height direction, such situations can be handled by combining height-specific potential membership functions.

11) Even if the shape of the robot changes due to factors such as a load that is being carried sticking out, an arm extending or retracting, or the robot tilting its upper part, the capsule case model is changed in response.

Although the autonomous mobile robot 10 was given as an example in the embodiment, the present invention can also be implemented with a device such as an auto-guided vehicle equipped with a slide fork, a scalar arm, a turntable or the like that runs along the ground. Apart from a robot that moves on wheels, the present invention can be similarly implemented with a robot having translational degrees of freedom in two directions and rotational degrees of freedom, giving a total of three or more degrees of freedom, such as a walking robot, a machine tool or a conveying device.

DESCRIPTION OF REFERENCE NUMERALS

10 Autonomous mobile robot
11 Front surface
12 Upper part
13 Platform vehicle
14 Laser range finder
15 Movement controller
16 Arm
21 Omni-directional wheel
22 Motor
23 Wheel drive unit
24 Support frame
25 Bracket
26 Housing
27 Output axis
31 Drive wheel
32 Free roller
34 Main controller
35 Input unit
36 Map storage unit
37 Path generator
40 Motion controller
41 Data processor
42 Environment data processor
43 Own data processor
44 Translational motion controller
45 Rotational motion controller
46, 47 Fuzzy processor
48 Driving command generator 50 Capsule case
60, 70 Autonomous mobile robot
62, 72, 74 Capsule case
63, 64 Circular arc
65, 66 Line segment
80, 82 Obstacle
PMF Potential membership function
W Width of platform vehicle
L Length of platform vehicle
$C_a$ ½ width of capsule case
$C_R$ Distance from center of platform vehicle to right end of line segments of capsule case
$C_L$ Distance from center of platform vehicle to left end of line segments of capsule case
Po Center of platform vehicle
$P_R$ and $P_L$ Endpoints of line segments of capsule case
$r_o$ Radius of obstacle
$d_s$ Safe distance
$\omega$ Angular velocity
$\psi$ Directional angle
$\psi_{r\_o}$ Direction of obstacle relative to front surface of platform vehicle
$\psi_{out}$ Translational direction angle of platform vehicle
$\psi_L$ Difference in directional angles from endpoint $P_L$ and center Po of platform vehicle to center of obstacle
$\psi_R$ Difference in directional angles from endpoint $P_R$ and center Po of platform vehicle to center of obstacle

The invention claimed is:

1. An autonomous mobile body configured to avoid an obstacle and move autonomously to a goal, comprising:
a platform vehicle having a movement mechanism configured to translate in a horizontal plane and rotate around a vertical axis;
an obstacle sensor for deriving a distance to an obstacle for each directional angle;
a potential generator for generating a translational potential of the mobile body and a rotational potential of the mobile body for avoiding interference with the obstacle, based on the distance from the autonomous mobile body to the obstacle at each directional angle;
a control amount generator for generating an amount of control relating to a translational direction and a translational velocity of the mobile body and an amount of control relating to a rotational direction and an angular velocity of the mobile body, based on the generated potentials;
a drive controller for combining the generated amounts of control and driving the movement mechanism; and
wherein the autonomous mobile body is processed as a body with anisotropy and said body includes a major axis and a minor axis.

2. The autonomous mobile body according to claim 1, the potentials being potential membership functions according to a fuzzy potential method, the translational potential membership function representing a degree of interference with the obstacle at each translational direction angle, and the rotational potential membership function representing a degree of interference with the obstacle at each rotational direction angle.

3. The autonomous mobile body according to claim 2, the control amount generator deciding a translational velocity between a highest translational velocity and a lowest translational velocity, and deciding an angular velocity between a highest angular velocity and a lowest angular velocity, based on values of the potential membership functions.

4. The autonomous mobile body according to claim 2, the potential generator generating translational and rotational potential membership functions for each of a plurality of obstacles, generating translational and rotational potential membership functions for guiding the autonomous mobile body to a destination, and combining the potential membership functions for the obstacles with the potential membership functions for the destination respectively for translation and rotation.

5. The autonomous mobile body according to claim 4, the combining of translational potential membership functions involves deriving, for each directional angle, a highest value or a lowest value from a result of combining the plurality of translational potential membership functions, and the combining of rotational potential membership functions involves deriving, for each directional angle, a highest value or a lowest value from a result of combining the plurality of rotational potential membership functions.

6. The autonomous mobile body according to claim 1, the control amount generator deriving the amount of translational control and the amount of rotational control independently.

7. The autonomous mobile body according to claim 1, the movement mechanism having three or more drive wheels each provided, on a perimeter thereof, with a roller configured to rotate in a direction parallel to a wheel axis, and the three or more drive wheels including a drive wheel having a different wheel axis direction.

8. A method of controlling movement of an autonomous mobile body configured to avoid an obstacle and move autonomously to a goal, the mobile body having a movement mechanism configured to translate in a horizontal plane and rotate around a vertical axis, the method causing the mobile body to perform the steps of:
deriving a distance from the autonomous mobile body to an obstacle for each directional angle using an obstacle sensor;
processing the autonomous mobile body with anisotropy;
generating a translational potential of the mobile body and a rotational potential of the mobile body for avoiding interference with the obstacle, based on the distance from the autonomous mobile body to the obstacle at each directional angle;
generating an amount of control relating to a translational direction and a translational velocity of the mobile body and an amount of control relating to a rotational direction and an angular velocity of the mobile body, based on the generated potentials; and
combining the generated amounts of control and driving the movement mechanism.

9. The autonomous mobile body according to claim 3, the potential generator generating translational and rotational potential membership functions for each of a plurality of obstacles, generating translational and rotational potential membership functions for guiding the autonomous mobile body to a destination, and combining the potential membership functions for the obstacles with the potential membership functions for the destination respectively for translation and rotation.

10. The autonomous mobile body according to claim 2, the control amount generator deriving the amount of translational control and the amount of rotational control independently.

11. The autonomous mobile body according to claim 3, the control amount generator deriving the amount of translational control and the amount of rotational control independently.

12. The autonomous mobile body according to claim 4, the control amount generator deriving the amount of translational control and the amount of rotational control independently.

13. The autonomous mobile body according to claim 5, the control amount generator deriving the amount of translational control and the amount of rotational control independently.

14. An autonomous mobile body configured to avoid an obstacle and move autonomously to a goal, comprising:
- a platform vehicle having a movement mechanism configured to translate in a horizontal plane and rotate around a vertical axis;
- one or more extendible arms projecting from the mobile body; which result in a non-uniform shape temporally based on arms projections and retractions while in use;
- an obstacle sensor for deriving a distance to an obstacle for each directional angle;
- a potential generator for generating a translational potential of the mobile body and a rotational potential of the mobile body for avoiding interference with the obstacle, based on the distance from the autonomous mobile body to the obstacle at each directional angle;
- a control amount generator for generating an amount of control relating to a translational direction and a translational velocity of the mobile body and an amount of control relating to a rotational direction and an angular velocity of the mobile body, based on the generated potentials;
- a drive controller for combining the generated amounts of control and driving the movement mechanism;
- wherein the autonomous mobile body is processed as a body with anisotropy and said body includes a major axis and a minor axis;
- wherein the potentials are potential membership functions according to a fuzzy potential method, the translational potential membership function representing a degree of interference with the obstacle at each translational direction angle, and the rotational potential membership function representing a degree of interference with the obstacle at each rotational direction angle;
- wherein the control amount generator decides a translational velocity between a highest translational velocity and a lowest translational velocity, and decides an angular velocity between a highest angular velocity and a lowest angular velocity, based on values of the potential membership functions.

15. The autonomous mobile body according to claim 14, the movement mechanism having three or more drive wheels each provided, on a perimeter thereof, with a roller configured to rotate in a direction parallel to a wheel axis, and the three or more drive wheels including a drive wheel having a different wheel axis direction.

16. The autonomous mobile body according to claim 14, the potential generator generating translational and rotational potential membership functions for each of a plurality of obstacles, generating translational and rotational potential membership functions for guiding the autonomous mobile body to a destination, and combining the potential membership functions for the obstacles with the potential membership functions for the destination respectively for translation and rotation.

17. The autonomous mobile body according to claim 14, the control amount generator deriving the amount of translational control and the amount of rotational control independently.

* * * * *